United States Patent
Buhlman et al.

(10) Patent No.: US 10,467,168 B2
(45) Date of Patent: Nov. 5, 2019

(54) SYSTEMS AND METHODS FOR MODULAR EXPANSION IN DATA STORAGE LIBRARIES

(71) Applicant: Oracle International Corporation, Redwood Shores, CA (US)

(72) Inventors: Craig A. Buhlman, Boulder, CO (US); Kenneth Lee Manes, Brighton, CO (US); Steven Craig Cacka, Longmont, CO (US); Vrushank Shripad Phadnis, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 27 days.

(21) Appl. No.: 15/681,253

(22) Filed: Aug. 18, 2017

(65) Prior Publication Data

US 2019/0042509 A1 Feb. 7, 2019

Related U.S. Application Data

(60) Provisional application No. 62/542,224, filed on Aug. 7, 2017.

(51) Int. Cl.
| | |
|---|---|
| H04L 12/935 | (2013.01) |
| G06F 13/40 | (2006.01) |
| G06F 13/42 | (2006.01) |
| H04L 12/741 | (2013.01) |
| G06F 3/06 | (2006.01) |

(52) U.S. Cl.
CPC ........ *G06F 13/4022* (2013.01); *G06F 3/0607* (2013.01); *G06F 3/0631* (2013.01); *G06F 3/0689* (2013.01); *G06F 13/4282* (2013.01); *H04L 45/745* (2013.01); *H04L 49/30* (2013.01); *G06F 2213/0002* (2013.01)

(58) Field of Classification Search
None
See application file for complete search history.

(56) References Cited

U.S. PATENT DOCUMENTS

| | | | |
|---|---|---|---|
| 5,819,309 A * | 10/1998 | Gray | G06F 3/0613 |
| | | | 711/111 |
| 6,484,222 B1 * | 11/2002 | Olson | G06F 13/423 |
| | | | 710/300 |
| 6,675,254 B1 | 1/2004 | Wachel | |

(Continued)

*Primary Examiner* — Elias Mamo
(74) *Attorney, Agent, or Firm* — Invoke

(57) ABSTRACT

Systems and methods are described herein for modular expansion of data storage libraries. In one or more embodiments, an apparatus for modularly expanding a base module apparatus comprises a plurality of drive trays and a network switch for coupling the apparatus to the base module apparatus. The first drive tray may be coupled to the network switch and include a first hardware processor that sends status information about a first hardware device to the base module apparatus over a first network path. The second drive tray may also be coupled to the network switch and include a second hardware processor that sends status information about a second hardware device to the base module apparatus over a second network path. Network addresses may be assigned to the hardware devices based on the module's position in the library relative to the base module.

19 Claims, 11 Drawing Sheets

(56) References Cited

U.S. PATENT DOCUMENTS

| | | | |
|---|---|---|---|
| 6,865,053 B2 * | 3/2005 | Bengds | G11B 15/6835 360/92.1 |
| 7,469,274 B1 * | 12/2008 | Ryu | G06F 21/78 709/214 |
| 9,842,016 B2 * | 12/2017 | Batchelor | G06F 11/0778 |
| 2007/0294433 A1 | 12/2007 | Leigh | |
| 2008/0052437 A1 * | 2/2008 | Loffink | G06F 1/189 710/302 |
| 2012/0163395 A1 | 6/2012 | Shukla et al. | |
| 2012/0278551 A1 | 11/2012 | Chakhaiyar et al. | |
| 2013/0080697 A1 * | 3/2013 | Dhandapani | G06F 11/3034 711/114 |
| 2017/0070431 A1 | 3/2017 | Nidumolu et al. | |

\* cited by examiner

SYSTEMS AND METHODS FOR MODULAR EXPANSION IN DATA STORAGE LIBRARIES

BENEFIT CLAIM; RELATED APPLICATIONS

This application claims the benefit of U.S. Provisional Patent Appln. No. 62/542,224, filed Aug. 7, 2017, the entire contents of which are incorporated by reference as if set forth in their entirety.

This application is related to U.S. application Ser. No. 15/681,238, entitled "HIGH DENSITY CABLING AND ROUTING FOR SWITCHED NETWORK NODES", the entire contents of which are incorporated by reference as if set forth in their entirety.

TECHNICAL FIELD

The present disclosure relates, generally, to computer storage, and more specifically, to techniques for modularly expanding the functionality and capacity of data storage libraries.

BACKGROUND

Data storage libraries are systems that store large amounts of data for archival and backup applications. Example computer storage libraries may include, but are not limited to, tape libraries, which store data on tape cartridges, and optical jukeboxes, which store data on optical discs. In many cases data storage libraries include robotic devices for automatically loading and unloading storage media from storage drives. In the case of tape libraries, a robot may automatically load and eject cartridges from tape drives. With optical jukeboxes, the robot may automatically load and eject optical discs from optical drives.

Data storage libraries often include expensive components that are resource-intensive. In addition, data storage libraries may have a large physical footprint that consume valuable space within a datacenter or cloud computing environment. To minimize costs and inefficacies, many system administrators are reluctant to deploy more data storage library resources than needed. However, storage demands may increase over time as more clients are added and more data is generated. System administrators may be challenged with adding more library capacity while providing minimal disruption. Failure to meet storage demands carries the risk of data loss, reduced quality of service, and financial penalties.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
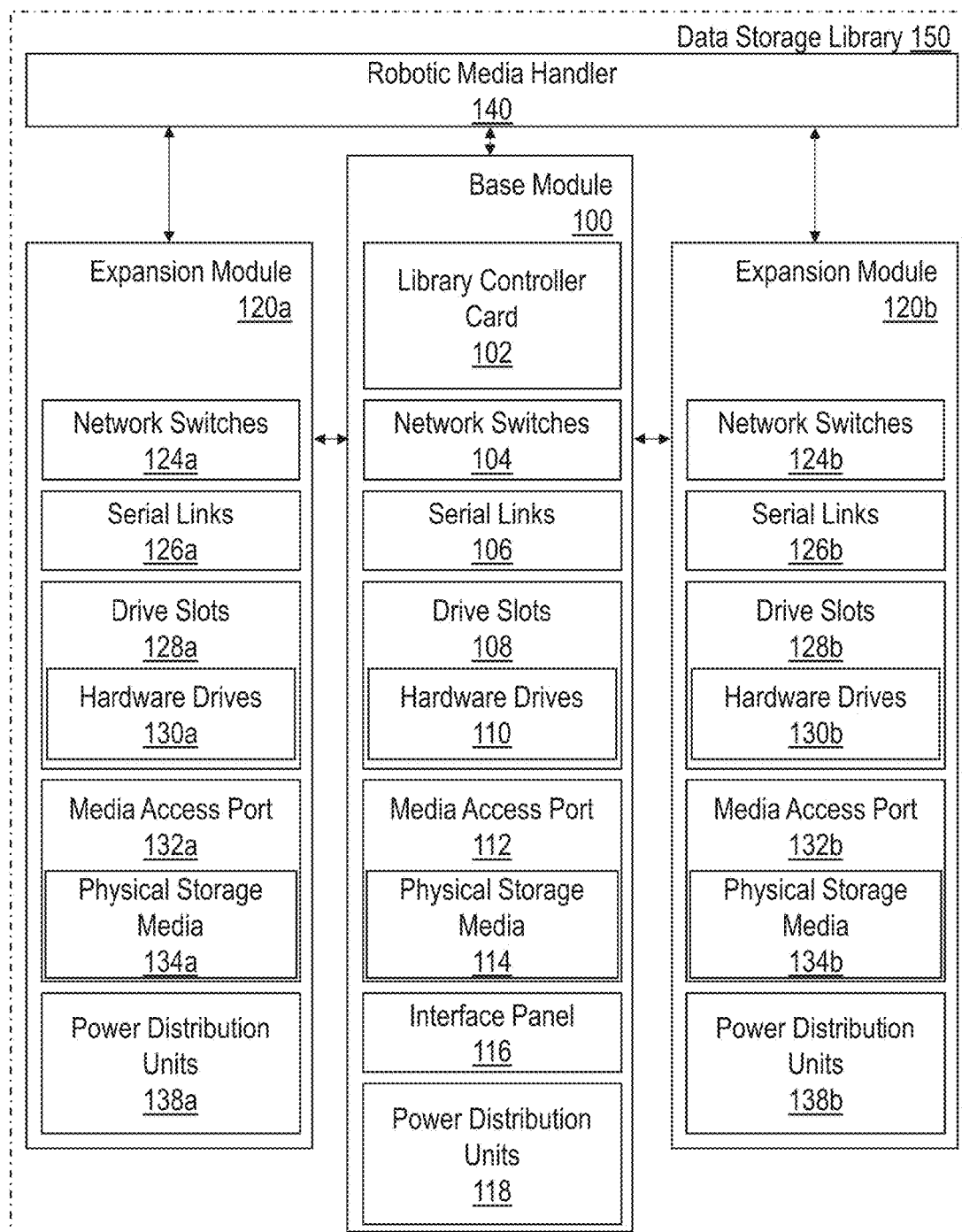
FIG. 1 illustrates a data storage library including a base module and a plurality of expansion modules according to one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. LIBRARY MODULES AND HARDWARE COMPONENTS
3. NETWORK-SWITCHED EXPANSION MODULES AND DRIVE TRAYS
4. INTERCHANGEABLE HARDWARE DRIVE TRAYS
5. POSITION-BASED ADDRESS CONFIGURATION
6. LIBRARY MONITORING AND DRIVE ALLOCATION
7. MISCELLANEOUS; EXTENSIONS

1. General Overview

Systems and methods are described herein for modular expansion of data storage libraries. The techniques described herein provide for seamless and flexible scalability of modular library components. Additional storage drives and physical storage media may be added with little to no service disruption. Consolidation of library resources may also be simplified to save space, power, and costs.

In one or more embodiments, modular expansion is performed relative to a base module. A base module refers to an apparatus that includes a first set of base components, such as a library control card, one or more data storage drives, and physical storage media. The base module may include a plurality of slots to which a system administrator or other user may add additional hardware drives, physical storage media, and/or other components to expand capacity.

Additionally or alternatively, the capacity of a base module may be increased by adding one or more expansion modules. An expansion module is an apparatus that includes a set of components that extend or expand on the set of base components in the base module apparatus. For example, an expansion module may be added to the data storage library to increase the total number of storage drives, tape cartridges, and/or optical discs in the library.

In one or more embodiments, processing elements, including one or more hardware processors, are included in each hardware drive tray of the base and/or expansion modules. The hardware processors may be configured to gather status information and perform commands locally. With separate processors included in each hardware drive, the overhead of performing these operations is shifted away from the main library controller card. Thus, a library controller card may be able to manage a greater number of hardware drives, improving scalability of the data storage library.

In one or more embodiments, hardware drive trays are connected to the library controller card via one or more network switches. The network switched storage drives may support a greater number of hardware drives in the data storage library. Direct connections to a library controller card, by comparison, are limited by the number of ports and physical surface area of the library controller card. Additionally, network switched storage drives allow expansion modules to be placed in any position within the library relative to a base module. The flexible placement allows media expansion and drive expansion modules to be organized into performance zones where robots may access cartridges and drives without interfering with each other.

In one or more embodiments, different types of hardware drives are interchangeable within a base and/or expansion module. For example, a slot in a module may be couplable to a tape drive, an optical drive, an application server, a database server, a web server, JBOD units, and/or other electronic components. By packaging server and other electronics in a library tray form factor, these components may be installed in unused storage library slots. Additionally, these components may use available resources within the library without requiring additional resources from a datacenter or cloud environment.

In one or more embodiments, base and/or expansion modules may provide one or more dedicated slots for processors cards and mass storage cards. The dedicated slots allow library support applications to reside directly within the data storage library rather than on external servers. The processor and mass storage cards may connect directly to the data storage library's internal communication structure so that support can be provided without any external resources.

The base and expansion modules described herein allow for flexible arrangement and scaling of library resources. System administrators may add, remove, and rearrange expansion modules based on storage demands and access patterns. Drive expansion modules and media expansion modules, such as cartridge and disc expansion modules, may be grouped into zones to minimize load times and prevent robot interference. Library resources may be quickly scaled up without the need to replace existing library components or add a separate data storage library.

2. Library Modules and Hardware Components

In one or more embodiments, a data storage library includes a set of library modules. A "module" in this context refers to a set of library components that are packaged or otherwise grouped together. Example library modules may include, but are not limited to, a base module, a drive expansion module, media expansion module, and a parking expansion module.

In one or more embodiments, a data storage library includes at least one base module. The base module includes set of one or more base components that allow the base module to exist in a standalone configuration without the need for any additional modules. Example hardware base components include, but are not limited to, Library controller cards for coordinating component operations and managing library resources such as a robotic media handler;

Host connectivity cards for connecting the base modules to other modules and network hosts;

Hardware drive slots for coupling hardware drives, such as tape drives and disk drives, to base module resources;

Data storage drives for reading and writing to physical storage media;

Media access ports for storing physical storage media such as tapes and optical discs; and Additional hardware drive trays supporting servers and library support applications.

Expansion modules may be coupled to the base module to increase capacity. For example, one or more of the following expansion modules may be coupled to a base module:

Drive expansion modules increase the number of storage drives and/or storage drive slots in the data storage library. In some cases, the drive expansion module may include one or more media access ports to increase the number of tape cartridges, optical discs, and/or other physical storage media in the data storage library.

Media expansion modules increase the number of media access ports and/or physical storage media in the data storage library. For example, a media expansion module may include additional cartridge and/or disc storage. Robots may be configured to move physical storage media between media expansion modules and storage drives in a drive expansion or base module.

Parking expansion modules provide parking spaces for robots. For example, a disabled robot may be moved to the parking spaces to prevent the robot from blocking other active robots.

FIG. 1 illustrates an example data storage library including a base module and a plurality of expansion modules according to one or more embodiments. Data storage library 150 comprises a plurality of library modules, including base module 100, expansion module 120a and expansion module 120b. Although three modules are depicted, the number of modules deployed may vary from implementation to implementation. For example, base module 100 may exist in a standalone configuration. In other cases, only a single expansion module or more than two expansion modules may be deployed. Modules may be added or removed from data storage library 150 to scale up or scale down in accordance with storage demands. Additionally, software and/or hardware components described with relation to the example architecture may be omitted or associated with a different set of functionality than described herein. Software and/or hardware components, not described herein, may be used within an environment in accordance with one or more embodiments. Accordingly, the example environment should not be construed as limiting the scope of any of the claims.

Base module 100 generally comprises library controller card 102, network switches 104, serial links 106, drive slots 108, media access ports 112, interface panel 116, and power distribution units 118. The set of base components in base module 100 may be coupled via wire, optical fiber, conductive traces (e.g., an electrical bus), and/or through other parallel and/or serial connections. A description of the example set of base components is provided below.

Library controller card 102 comprises one or more hardware processors for executing operations within data storage library 150 and provides an interface for communicating with one or more library clients (not depicted). The interface on library controller card 102 may include a set of connections, such as Ethernet and other network connections that allow a host machine (e.g., server appliances, workstations, laptops, mobile devices, or other library clients) to interact with the library. For example, a host machine may submit requests to read, write, and/or otherwise access data within data storage library 150. Responsive to such requests, the library controller card 102 may coordinate/control various component operations including, without limitation, entering or otherwise loading physical storage media (e.g., tape drives, discs) into storage drives, mounting/dismounting physical storage media, and ejecting physical storage media from the drives.

Additionally or alternatively, library controller card 102 may track and manage the status of hardware drives and physical storage media within data storage library 150. For example, library controller card 102 may track volume identifiers, attributes and locations of physical media (e.g., cartridges, discs, etc.) within data storage library 150. As another example, library controller card 102 may receive status data from hardware drive trays to track which hardware drives are currently available and which hardware drives are currently unavailable. Library controller card 102 may select hardware drives for loading physical storage media based on the status signals as described further below.

Additionally or alternatively, library controller card 102 interfaces with robotic media handler 140, which comprises one or more robots. A "robot" in this context is an electromechanical device that retrieves and inserts physical storage media (e.g., cartridges, discs, etc.) into media access ports or slots, mounts or dismounts physical storage media from hardware drives (e.g., tape drives, optical drives, etc.), and moves physical storage media from one location to another (e.g., from a hardware drive to a media access port or vice versa) within data storage library 150.

In one or more embodiments, robots move along a plurality of rails on a wall of data storage library 150. For example, a first rail may be located at the top of data storage library 150 and a second may be located near the floor. A rail may include copper strips and/or other conductive material to provide power and a signal path between the robot and library controller card 102. Robots may include a barcode scanner or camera that reads the configuration blocks in each module during library initialization and identifies volume serial numbers (VOLSERs) of physical storage media during library management operations.

In one or more embodiments, library controller card 102 sends signals to robotic media handler 140 over the rails to control the robots. The control signals may cause a robot to perform any of the operations previously described including, without limitation retrieving and insertion physical storage media, mounting or dismounting physical storage media, and moving physical storage media from one location to another. Control signals may also be sent to move inactive robots to a parking space (such as in a parking expansion module) and to otherwise position a robot relative to the modules in data storage library 150.

Library controller card 102 may comprise one or more hardware processors that execute library management software to coordinate and control components operations described herein. Additionally or alternatively, library controller card 102 may implement one or more of the operations through hardware logic, such as on a field programmable gate array (FPGA) or an application-specific integrated circuit (ASIC). Thus, the exact physical hardware architecture of the hardware processors may vary from implementation to implementation.

Base module 100 further comprises network switches 104 for routing data packets to components in data storage library 150. A network switch may be coupled to an external host or apparatus, such as another library module or a library client. Additionally or alternatively, a network switch may couple components within the same module together. For example, library controller card 102 may be coupled to drive slots 108 and the corresponding hardware drives 110 via one or more network switches. By coupling hardware drives and other components via a network switch rather than direct connection, library controller card 102 may support a greater number of hardware drives and other components, increasing scalability of data storage library 150.

Serial links 106 are ports for connecting base module 100 to adjacent modules. In one or more embodiments, serial links 106 are used to send signal to determine the position of each module in data storage library 150 relative to base module 100. Location-based network addresses may be generated and assigned to storage drives and other components based on the position relative to base module 100. Techniques for assigning network addresses based on location are described below in the section entitled POSITION-BASED ADDRESS CONFIGURATION.

Drive slots 108 include connectors for coupling hardware drives 110 to base module 100. Drive slots 108 may allow any mix of supported drives and media. For example, hardware drives 110 may include any combination of tape drives, optical disc drives, servers or other hardware drive trays, where each drive tray is coupled to a corresponding drive slot.

In some cases, one or more slots of base module 100 may remain empty. As data storage library 150 is scaled up, additional hardware drives may be added to base module 100 until all drive slots 108 are filled. If all drive slots 108 have been filled, additional capacity may be added via expansion modules.

Media access port 112 provides a storage area for housing physical storage media 114, and provides a means for transferring the physical storage medium into and out of the data storage library 150. For example, media access port 112 may include slots that hold tape cartridge, optical discs, and/or other storage media. Robotic media handler 140 may be configured to move individual media objects (e.g., cartridges, discs, etc.) from media access port 112 to a hardware drive within base module 100. A media access port 112 may store dozens, hundreds, or even thousands of cartridges or optical discs, depending on the particular implementation.

Base module 100 may further comprise interface panel 116, for interacting with users. Interface panel 116 may include output devices, such as light emitting diodes (LEDS) and/or a display screen, to present messages to a user. Example messages that may be presented may include, without limitation, status updates to indicate the current state of data storage library 150 (e.g., library processor working, library firmware loading, library rebooting) and error messages to provide information about problems encountered during component operations. Interface panel 116 may further include input means, such as buttons, touchscreens, switches, alphanumeric keys, etc. for receiving input. A user may interact with interface panel 116 to perform various operations, such as updating firmware, checking status information for the modules and drives, etc.

Power distribution units (PDUs) 118 provide power to other components within base module 100. PDUs 118 may include alternating current and/or direct current (DC) power supplies. PDUs 118 may be coupled to other components in base module 100 via a set of power rails, which may comprise copper and/or other conductive materials.

Expansion module 120a and 120b may be coupled to base module 100 to expand the capacity of library resources, such as the number of hardware drives and/or media access ports. Expansion module 120a may generally comprise network switches 124a, serial links 126a, drive slots 128a coupled to hardware drives 130a, media access port 132a, physical storage media 134a, and PDUs 138a. Similarly, expansion module 120b comprises network switches 124b, serial links 126b, drive slots 128b coupled to hardware drives 130b, media access port 132b, physical storage media 134b, and PDUs 138b. As previously indicated, data storage library 150 may include additional or fewer expansion modules. The components of each expansion module may also vary from implementation to implementation. For instance, an expansion module may include additional drive slots but not an additional media access port or vice versa.

In one or more embodiments, library controller card 102 may perform any of the component operations described herein on the expansion modules. For example, library controller card 102 may track volume identifiers, attributes and locations of physical media in each expansion module. Library controller card 102 may further manage entering or otherwise loading physical storage media into storage drives, mounting/dismounting physical storage media, and ejecting physical storage media from storage drives on the expansion modules. To facilitate library management, components within expansion module 120a and expansion module 120b may be configured to send status signals to library controller card 102. Library controller card 102 may use the status signals to determine where drives are located, which drives are available, and if any drives have experiencing problems. Responsive to receiving requests from library clients, library controller card 102 may balance data access operations across drives and expansion modules.

In one or more embodiments, expansion modules may be arranged into performance zones. For example, one performance zone may comprise a drive expansion module and a media expansion module that are placed contiguously within data storage library 150. A separate performance zone may comprise a separate drive expansion module and a separate media expansion module placed contiguously in a different location within data storage library (e.g., one may be to the left of base module 100 and the other to the right of base module 100). If robotic media handler 140 includes two robots, one may be assigned to handle component operations in the first performance zone while another robot handles component operations in the second performance zone. This reduces the chances of robot interference and may decrease data access times.

3. Network-Switched Expansion Modules and Drive Trays

In one or more embodiments, expansion modules 120a and 120b are coupled to base module 100 through one or more network switches. As previously indicated, by coupling modules and components via a network switch rather than direct connection, library controller card 102 may support a greater number of expansion modules. In addition, network-switched modules provide more configuration flexibility, allowing modules to reside in any location within data storage library 150. For example, a drive expansion module may be positioned contiguously on either side of base module 100 or may be separated from base module 100. Media expansion modules may be placed between the base module and the drive expansion module or vice versa. Other expansion module may also be placed anywhere in data storage library 150. Thus, the possible configurations are numerous.

Figure 2:
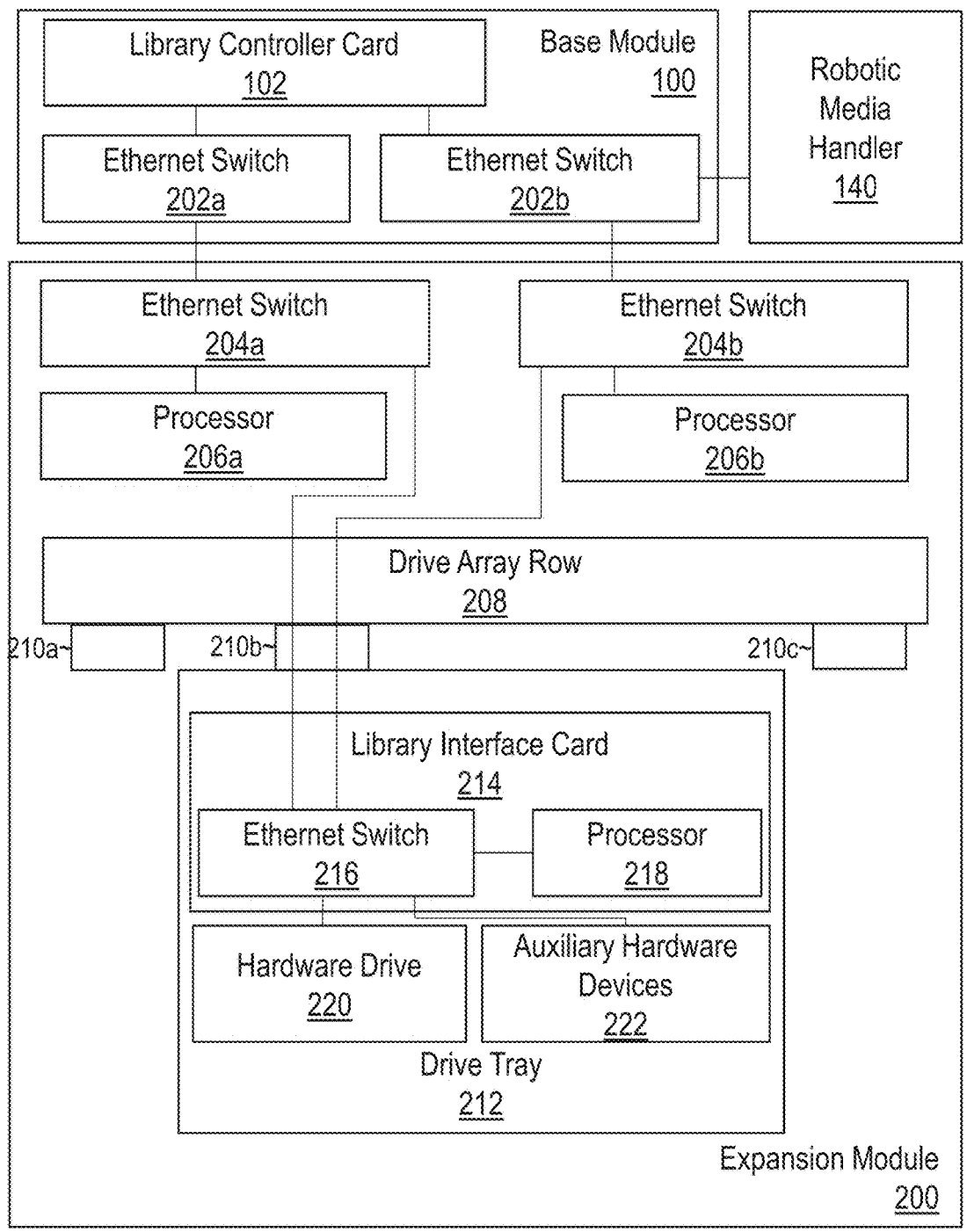
FIG. 2 illustrates an example expansion module that includes a plurality of drive trays that are coupled to a library controller card of a base module through a series of network switches according to one or more embodiments.

FIG. 2 illustrates an example expansion module that includes a plurality of drive trays that are coupled to a library controller card of a base module through a series of network switches according to one or more embodiments. Library controller card 102 of base module 100 is connected to a port on Ethernet switch 202a and a port on Ethernet switch 202b. Two switches provide a redundant path in the case of component failures or other problems that render one of the paths inaccessible. In other embodiments, only one Ethernet switch may be used or more than two Ethernet switches may be used.

Robotic media handler 140 is coupled to a port of Ethernet switch 202b. Library controller card 102 may route robot control signals from the network path through Ethernet switch 202b to robotic media handler 140. In some embodiments, robotic media handler 140 may also be coupled to Ethernet switch 202a to provide a redundant path from library controller card 102 to the robots.

Expansion module 200 generally comprises Ethernet switch 204a and Ethernet switch 204b, processor 206a and processor 206b, drive array row 208, and drive tray 212. Ethernet switch 204a includes, without limitation, (a) a first port that is coupled to a port of Ethernet switch 202a, (b) a second port that is coupled to processor 206a, and (c) a third port that is coupled to drive tray 212. Ethernet switch 204b provides redundancy and includes, without limitation, (a) a first port that is coupled to a port of Ethernet switch 202b, (b) a second port that is coupled to microprocessor 206b, and (c) a third port that is coupled to drive tray 212.

Ethernet switches 204a and/or 204b may include additional ports to connect to other drive trays in drive array row 208 or in other drive array rows (not depicted) within expansion module 200. Although only one drive array row 208 is shown, expansion module 200 may comprise a plurality drive array rows. Each drive array row comprises a plurality of drive slots, such as drive slot 210a, drive slot 210b, and drive slot 210c. In one or more embodiments, an expansion module may comprise eight drive array rows, each including four drive slots, allowing for up to thirty-two hardware drives to be coupled. Ethernet switches 204a and 204b may thus include additional ports for each of the drive slots. However, the number or drive array rows and drive slots may vary from implementation to implementation.

A drive slot comprises an aperture that allows drive trays to be inserted. The drive slot may comprise connectors, such as Ethernet and power connectors, to supply data and power to a connected hardware drive. The dimensions of a drive tray slot may vary from implementation to implementation.

Example drive trays are illustrated in the section below entitled INTERCHANGEABLE HARDWARE DRIVE TRAYS.

When a drive tray is connected to a drive slot, a network connection may be established with library controller card 102. For example, drive tray 212 is coupled to drive slot 210*b*, which provides a set of redundant Ethernet connections. To establish the connection, drive tray 212 comprises library interface card 214 for interacting with library controller card 102. Library interface card 214 comprises Ethernet switch 216 and processor 218. Ethernet switch includes a first port that is coupled to a port of Ethernet switch 204*a* and a second port which is coupled to Ethernet switch 204*b*. Thus, redundant network paths are provided through a plurality of Ethernet switches.

Processor 218 may be a microprocessor, ASIC, FPGA, or other hardware processor for interfacing with library controller card 102. Processor 218 may execute firmware instructions or otherwise implement logic for performing various components operations. In one or more embodiments, processor 218 includes control and status connections to the hardware elements contained within drive tray 212, such as fans, the drive power supply, status LEDs, etc. Processor 218 may manage the devices in the tray by using the network connections provided through Ethernet switch 216 to communicate with library controller card 102 local status and commands.

Ethernet switch 216 further includes ports that are coupled to hardware drive 220 and one or more auxiliary hardware devices 222. Hardware drive 220 may be a storage drive (e.g., tape drive, optical disc drive, etc.), a server device (e.g., an application server, web server, database server, etc.), a JBOD unit, or any electronic drive. Auxiliary hardware devices 222 may include, but are not limited to, fans, encryption cards (for encrypting/decrypting data stored on physical storage media), status LEDs, and/or a drive power supply.

Although only one drive tray is depicted, other drive trays may also be coupled to drive array row 208 and/or other drive array rows within expansion module 200. Each drive tray may be coupled to a different drive slot and include similar components to those depicted for drive tray 212. Thus, a microprocessor and Ethernet switch chip may be included in each drive tray. Two of the ports on each Ethernet switch chip may be connected back through cards and cables to Ethernet switch cards 204*a* and 204*b*, which each include enough ports to connect all the tray slots within expansion module 200 back to base module 100, thereby establishing distinct and redundant paths to library controller card 102 for each drive tray. The processors in each drive tray may manage the devices in the tray (e.g., hardware drive, fans, etc.) by using the network connections to communicate with library controller card 102.

In one or more embodiments, Ethernet switches 204*a* and 204*b* include ports to connect other hardware elements within the module in addition to drive trays. For example, Ethernet switches 204*a* and 204*b* may include ports to connect to PDUs, tray resets etc. Processors 206*a* and 206*b* may manage Ethernet switches 204*a* and 204*b*, respectively, as well as reporting status on the hardware located within expansion module 200. For example, processors 206*a* and 206*b* may collect status information including, without limitation, DC power supply status, AC power consumption, hardware presence status, and hardware temperature data. The status information may be reported back to library controller card 102, which may use the information to generate reports, generate commands, and/or otherwise coordinate library management operations within data storage library 150.

4. Interchangeable Hardware Drive Trays

In one or more embodiments, drive slots are couplable to different types of hardware drive trays. As previously indicated, example hardware drive trays may include, but are not limited to, tape drive trays, optical disc drive trays, server trays, and JBOD trays. For each given slot, a user may insert, swap, or otherwise couple any of the compatible drive trays. Thus, different types of hardware drive trays may be interchangeable within the same drive slot of data storage library 150.

Drive tray interchangeability increases configuration flexibility and may optimize resource usage in a cloud or data center environment. For example, rather than hosting a server on a separate appliance, the server may be installed directly in a drive slot in base module 100 or one of the expansion modules. The server may share library resources, such as power and cooling, with other library components without needing additional floorspace or external datacenter resources. Further, different types of drives may be mixed or matched at any slot location within a module. One slot may have a tape drive, another a server, and another an optical drive. A user may rearrange the drive trays in any configuration to tailor data storage library 150 to specific applications.

Figure 3:
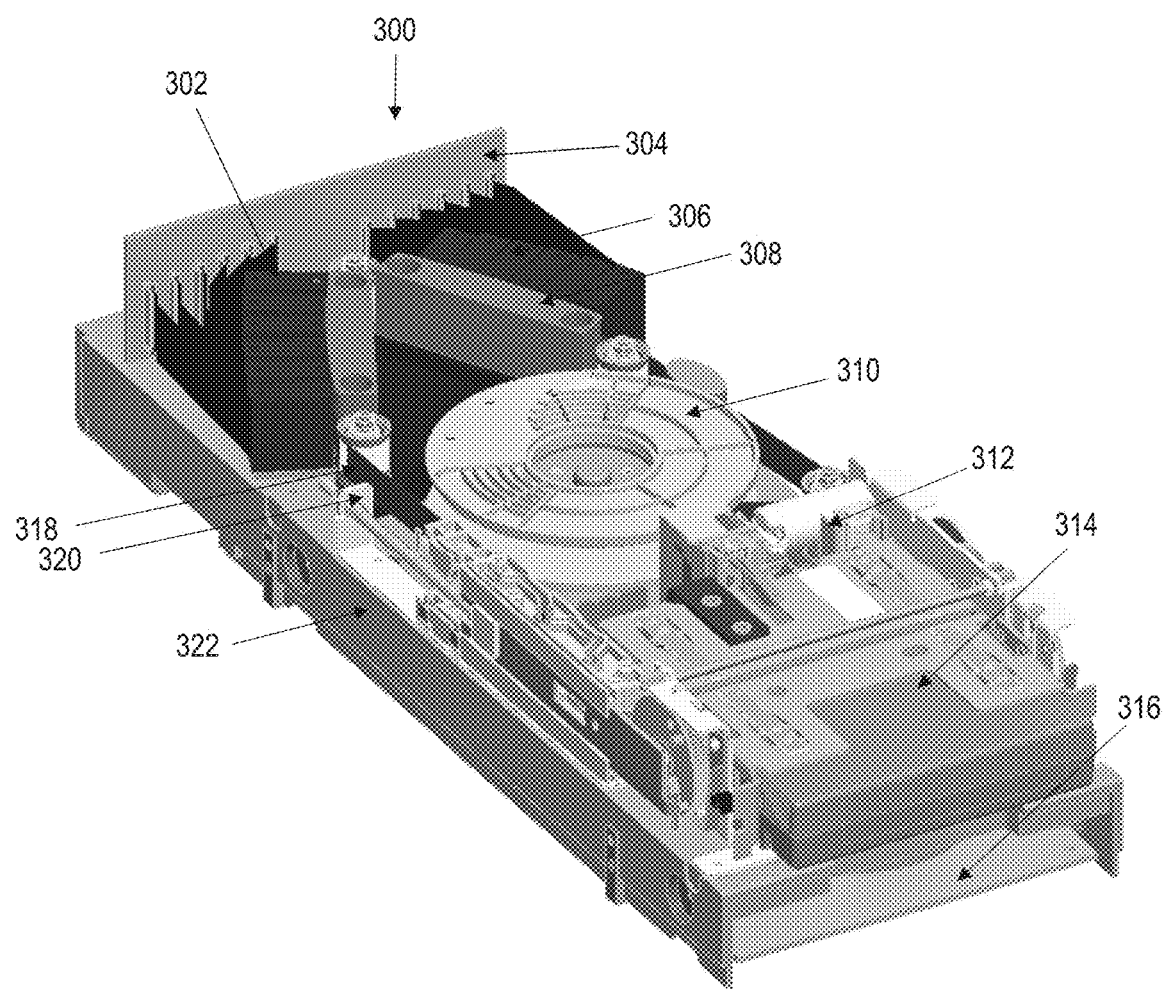
FIG. 3 illustrates an example perspective view of a tape drive in a drive tray that may be coupled to a slot in a base or expansion module according to one or more embodiments.

FIG. 3 illustrates an example perspective view of tape drive 300 that may be included in a drive tray that is coupled to a slot in a base or expansion module according to one or more embodiments. Tape drive 300 generally comprises servo control system 302, electronics/recording system 304, optical pick-up units (OPUs) 306, stabilizer blocks 308, take-up reel 310, RFID module 312, cartridge 314, library interface card 316, optical tape media 318, tape format 320, and tape drive frame 322. Library interface card 316 communicates status and control signals with library controller card 102. For example, library interface card 316 may receive data to write to cartridge 314 or a request to read data from cartridge 314. Responsive to command signals, library interface card 316 may coordinate reading or writing data to/from the loaded cartridge. In one or more embodiments, library interface card 316 sends control signals to servo control system 302, which may be coupled to and control servos in take-up reel 310. The servos may spin take-up reel 310 moving tape from cartridge 314 around OPUs 306 and stabilizer blocks 308. OPUs 306 may read and/or write data from tape. Electronics/recording system 304 are coupled to OPUs 306 and buffer data as it is read from or written to the tape. RFID module 312 may generate a RF signal that uniquely identifies tape drive 300 from other hardware drives in a module.

FIGS. 4A-D illustrate different views of server tray 400, which is in a drive tray form that may be coupled to a drive slot in a base or expansion module, according to one or more embodiments. Server tray 400 may have substantially similar dimensions (e.g., height and width) with a drive tray housing tape drive 300 such that the drives/drive trays are interchangeable in the same drive slot. Both drives may further include library interface cards and Ethernet switches to communicate status and control commands back to library controller card 102.

Figure 4A:
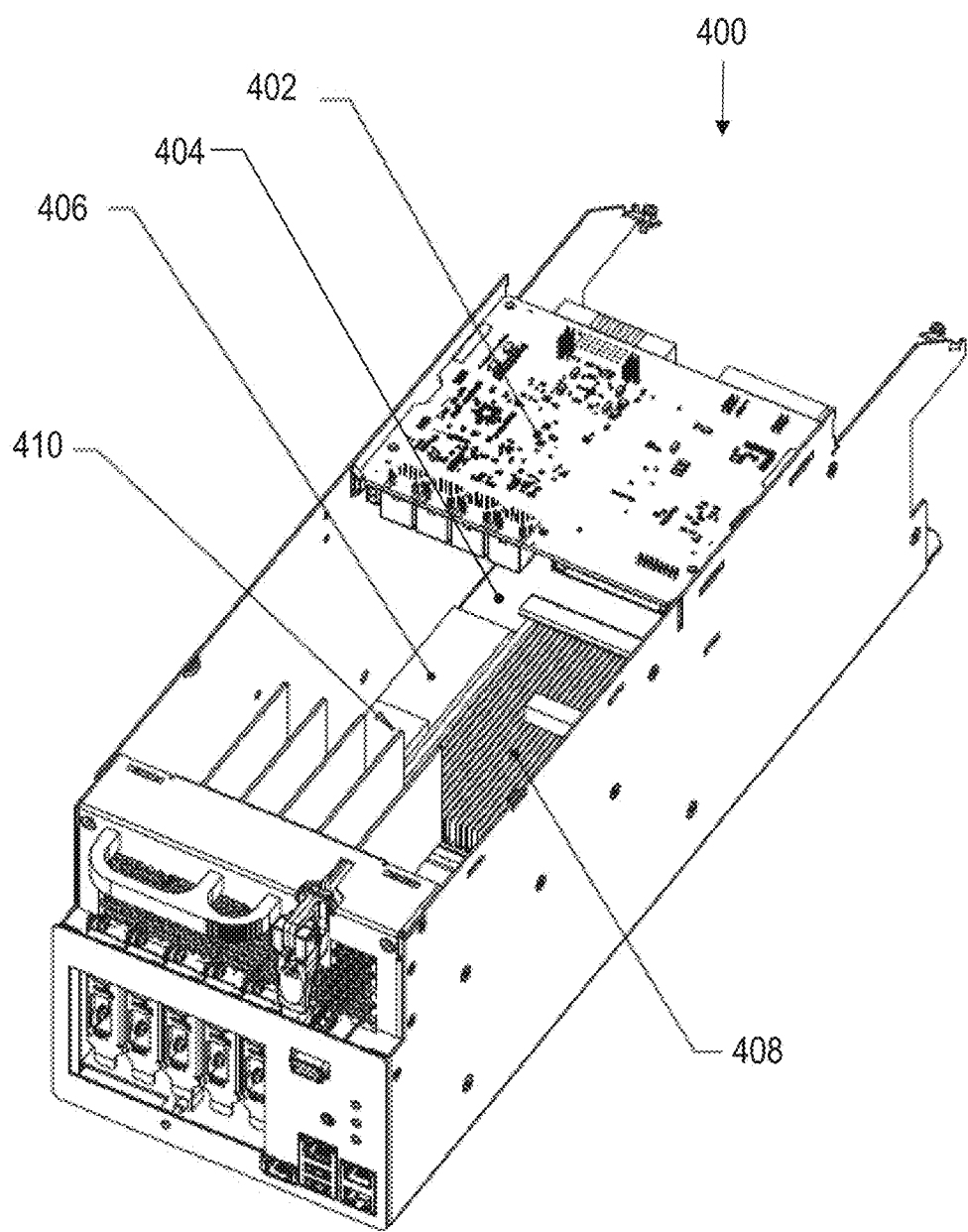
FIG. 4A illustrates an example perspective view of a server tray that may be coupled to a slot in a base or expansion module according to one or more embodiments.

FIG. 4A illustrates an example perspective view of server tray 400. As can be seen, server tray 400 generally comprises library interface card 402, server motherboard 404, hard drives 406, server processor 408, and Peripheral Component Interconnect Express (PCIe) interface cards 410. Library interface card 402 serves as an interface between the other components of server tray 400 and library controller card 102. Server processor 408 may execute operations implementing any type of server including, without limitation, a web server, an application server, and a database server. Library interface card 402 may include an Ethernet switch with ports connecting other components such as server motherboard 404, hard drives 406, and server processor 408.

Figure 4B:
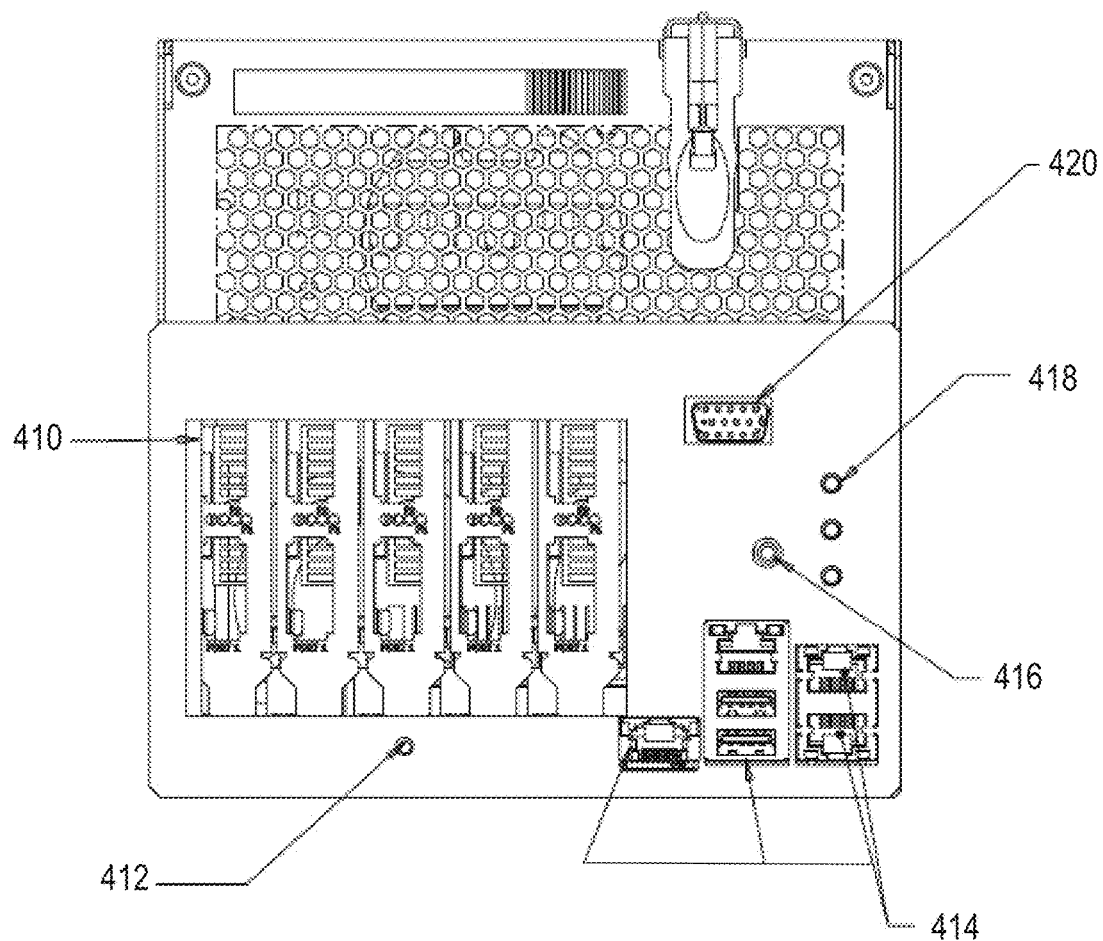
FIG. 4B illustrates an example front view of a server tray that may be coupled to a slot in a base or expansion module according to one or more embodiments.

FIG. 4B illustrates an example front view of server tray 400 according to one or more embodiments. On the front panel, server tray 400 includes PCIe interface cards 410, server reset switch 412, output ports 414 (including four Ethernet ports and two Universal Serial Bus ports), power switch 416, server status LEDs 418, and video graphics array (VGA) connector 420. The ports and interfaces may be coupled to server motherboard 404 or library interface card 402 and allow server to be connected to external hosts. Server status LEDs 418 may indicate whether the server is ready to be removed from a slot, experiencing a fault, or currently active.

Figure 4C:
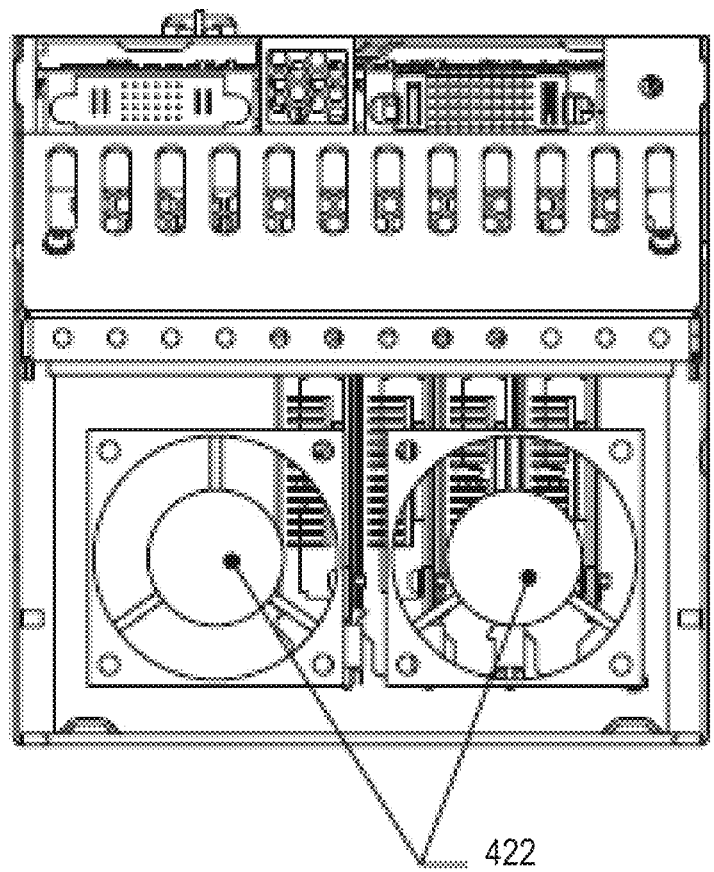
FIG. 4C illustrates an example rear view of a server tray that may be coupled to a slot in a base or expansion module according to one or more embodiments.

FIG. 4C illustrates an example rear view of server tray 400. Fans 422 are coupled to the back panel to provide cooling components of server. The fans may be electrically coupled to library interface card 402. The fan operations, such as speed, power, etc. may be controlled by server processor 408, by a module processor or by library controller card 102 depending on the particular implementation.

Figure 4D:
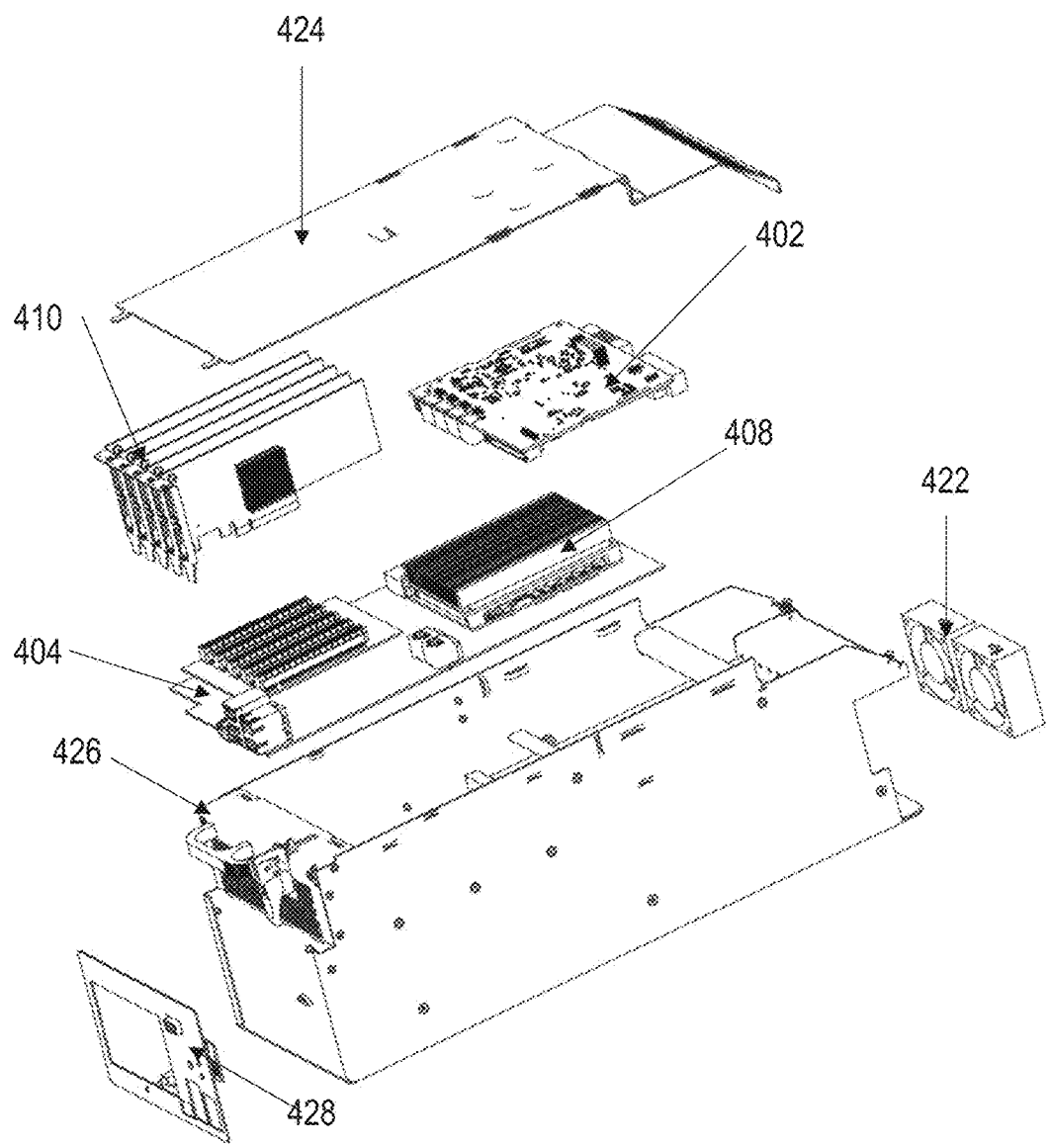
FIG. 4D illustrates an example exploded view of a server tray that may be coupled to a slot in a base or expansion module according to one or more embodiments.

FIG. 4D illustrates an example exploded view of server tray 400 that may be coupled to a slot in a base or expansion module according to one or more embodiments. PCIe interface cards 410 and server processor 408 are coupled to corresponding slots on server motherboard 404. These components are coupled to the base of tray body 426. Fans 422 are coupled to the back of tray body 426. Panel 424 is coupled to the top, and panel 428 is coupled to the front of tray body 426.

Server tray 400 may share library resources including, without limitation power, cooling, Ethernet switches, and network address space, A server application executing on server tray 400 may submit requests to access data in data storage library 150 through communication channels back to library controller card 102. For example, if server tray 400 is coupled to drive slot 210b, read and write requests may be routed through drive array row 208 to one of Ethernet switches 204a or 204b, back to base module 100 and library controller card 102. Responsive to the requests, library controller card 102 may perform one or more component operations, such as loading physical storage media into an available storage drive (e.g., moving a cartridge or disc from a media access port to a selected storage drive), sending command signals to the selected storage drive to perform a read or write, and ejecting the physical storage media from the drive.

The hardware drive trays illustrated in FIG. 3 and FIGS. 4A-D are meant to be illustrative and nonlimiting. The architecture of the drive trays may vary from implementation to implementation. For example, the drive trays may have different types of ports, different placement of components, and/or different sets of hardware components. Other types of drive trays may also be configured with similar dimensions to be interchangeable with the same drive slot. As previously indicated, these drive trays may include, without limitation, optical disc drive trays, JBOD trays, etc.

5. Position-Based Address Configuration

In one or more embodiments, a unique network address, such as an Ethernet internet protocol (IP) address, is assigned to each processing element within data storage library 150. For example, an IP address may be assigned to library controller card 102, processor 206a, processor 206b, library interface card 214, etc. Similarly, each hardware drive that is coupled to drive array row 208 may also be assigned or otherwise associated with a unique network address.

In one or more embodiments, network addresses are assigned and fixed based on the physical location of a device within data storage library 150. This allows library controller card 102 to determine the location of a hardware drive from the network address. When loading and unloading physical storage media from a storage drive, library controller card 102 may send control signals to robotic media handler 140 based on the network address to guide a robot to the appropriate location in the data storage library.

In one or more embodiments, library modules are configured to assign themselves a unique identifier when added to data storage library 150 based on the position relative to base module 100. To generate and assign the unique identifier, signals may be sent over serial links, such as serial links 106, 126a, and 126b, extending out either side of each module. The serial links may connect all the expansion modules in a base daisy chained fashion. Starting at the base, using the serial links, the modules directly to either side of the base are assigned identifiers. These modules then communicate with the next modules down the chain to assign the next identifiers, and so on until the last module determines that no other module is connected in the chain.

In one or more embodiments, processing elements within a module use the unique identifier assigned to the module to generate a unique IP address. For example, the unique identifier may be included as a prefix or other part of each IP address assigned within the module. Thus, the module where each hardware drive or other processing element may be determined from the IP address.

Figure 5:
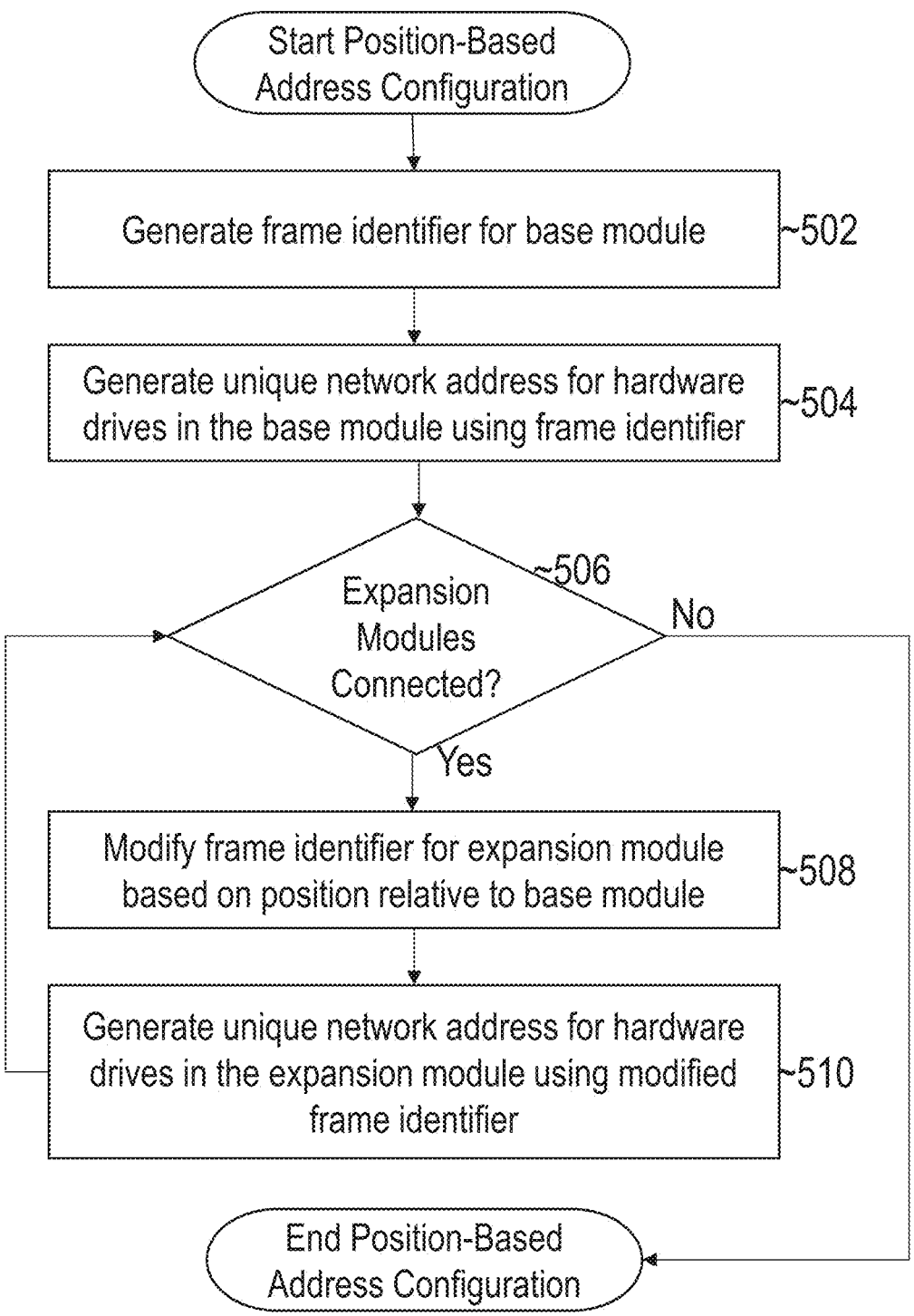
FIG. 5 illustrates an example set of operations for configuring network addresses for library components based on position relative to a base module according to one or more embodiments.

FIG. 5 illustrates an example set of operations for configuring network addresses for library components based on location relative to a base module according to one or more embodiments. The set of operations includes generating a frame identifier for a base module (Operation 502). The base frame identifier value may vary from implementation to implementation. In one or more embodiments, base module 100 may be assigned a value of one. However, other values may also be assigned, depending on the particular implementation.

The set of operations further comprises generating a unique network address for hardware drives in the base module using the frame identifier (Operation 504). In one or more embodiments, each unique network address is a position-based IP address. In the example where the base frame is one for instance, a base IP address may be assigned to a tape or other storage drive in a first position. For instance, the IP address 192.168.1.01 may be assigned where "1" indicates the frame/module number and ".01" indicates a position (e.g., the slot/location where the drive is coupled) of the storage drive. A drive in the next slot/position may be assigned an IP address of 192.168.1.02 and so on, with the IP address being incremented according to position in the module.

The set of operations further comprises determining whether there are any extension modules connected (Operation 506). To determine whether there are any expansion modules modules, library controller card 102 may cause a signal carrying the frame identifier to be sent out of a serial link on both sides of base module 100. As previously indicated, the signal may be propagated down a daisy chain of serial links until there are no more expansion modules in the chain. Terminators may be used to loop the signal back as described in further detail below.

If an expansion module is connected, then a processor in the expansion module modifies the frame identifier (Operation 508). For example, the processor may increment the frame identifier. Thus, if base module 100 sends the frame identifier with a value of one to an adjacent expansion module, the processor in the expansion module may increment the frame identifier to a value of two, and use this new value as the frame identifier for the expansion module. However, other modifications (e.g., decrementing, incrementing by two, etc.) may be performed depending on the particular implementation.

The set of operations further comprises generating a unique network address using the modified frame identifier (Operation 510). As with the base module, the unique network address may be generated and assigned based on the position of the drive within the module and the position of the module relative to the base module. For instance, if the frame identifier assigned to the expansion module is "2", then an IP address 192.168.2.01 may be assigned to a drive in a first position, 192.168.2.02 to a drive in a second position, etc.

The process returns to Operation 506 until each connected module is assigned a frame identifier and the processing elements contained therein assigned IP addresses. If there are no remaining expansion modules, then the positioned-based address configuration may end.

Figure 6:
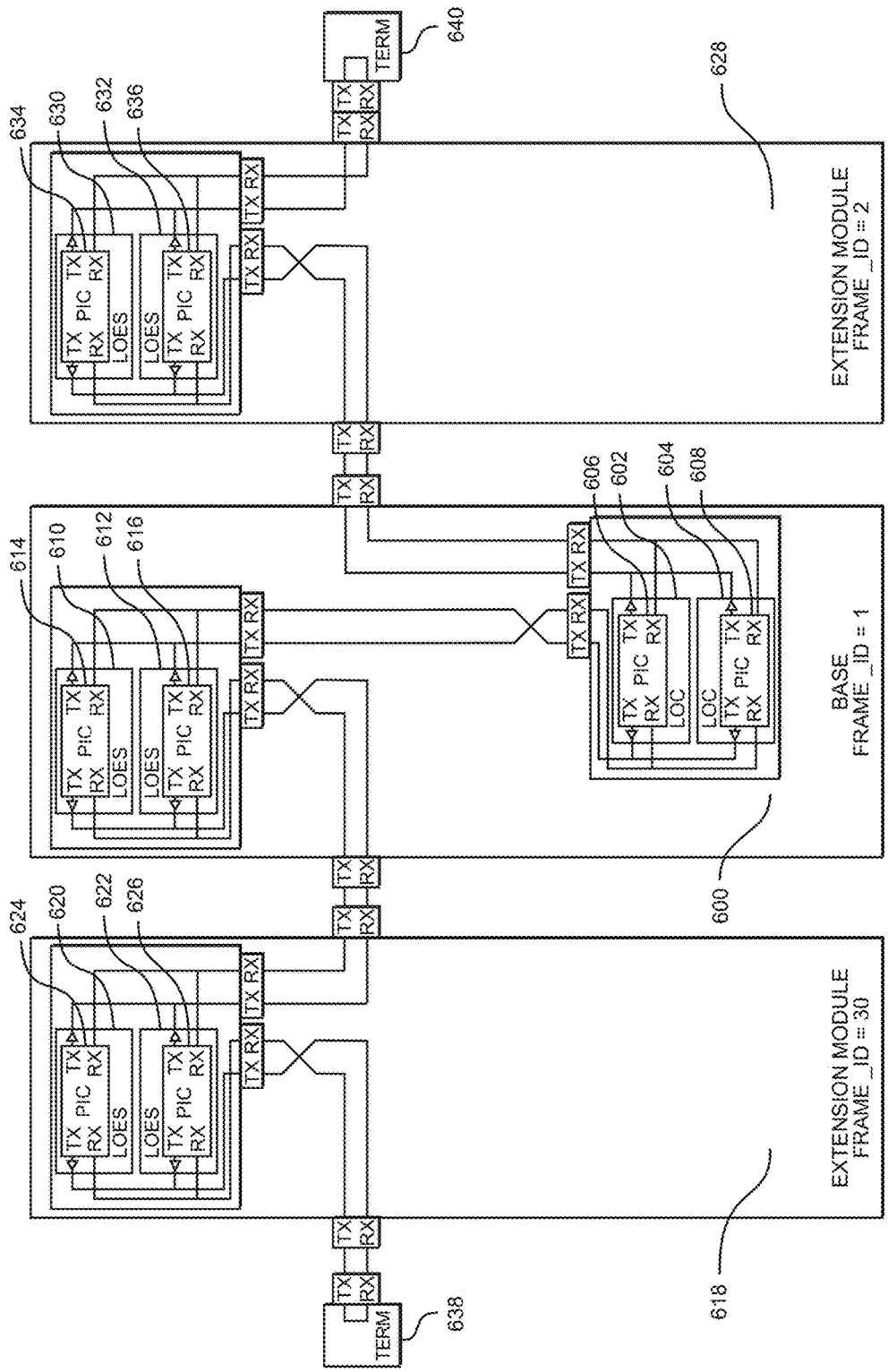
FIG. 6 illustrates an example set of expansion modules that generate a frame identifier based on a position relative to a base module according to one or more embodiments.

FIG. 6 illustrates an example set of expansion modules that generate a frame identifier based on a position relative to a base module according to one or more embodiments. Base module 600 comprises library control cards (LOCs) 602 and 604. LOCs 602 and 604 comprise microprocessors (PICs) 606 and 608, respectively. Base module 600 further comprises Ethernet switch cards (LOES) 610 and 612, each having a respective microprocessor (PICs 614 and 616, respectively). Expansion modules 618 and 628 each comprise two Ethernet switch cards, with LOES 620 and 622 on expansion module 618, and LOES 630 and 632 on expansion module 628. Each LOES is coupled to a microprocessor (PICs 624, 626, 634, and 636, respectively).

Microprocessors on the LOCs each have two serial links. One of the links connects to the module on the right, and the other connects to the module on the left. Starting in the library controller card (e.g., LOC 602 or 604), the microprocessor (e.g., PIC 606 or 608) assigns the module a frame ID (1). The microprocessor then sends a signal out the links on either side. The microprocessors on the Ethernet switch cards of the expansion modules increment or decrement the Frame ID received based on the direction from which it came. If the value is received from a module to the left, then the frame ID is incremented. Conversely, if the value is received from a module to the right, then the frame ID is decremented. The microprocessors (PICs 614 and 616) on LOES 610 and 612, respectively, are configured to use the received values without modification since these Ethernet switches are part of base module 600.

In one or more embodiments, media expansion modules do not include managed network devices. In this case, these modules may simply pass the serial connections from one side to another without modifying the frame identifier. For example, if a media expansion module is between a base module and a drive expansion module, the base module may be assigned a frame ID of "1". The value may be sent through serial links on the media expansion module without being modified. The drive expansion module may then receive the value and increment the value to "2".

Terminators 638 and 640 are placed at the end of the daisy-chain of library modules. Each terminator wraps the signal received over the serial link back through the modules. When a microprocessor on the Ethernet switch cards receives a message from the side from which the frame ID was previously transmitted, the Ethernet switch card retransmits out the other port without modification. Eventually the frame ID messages arrive back at the LOC, which indicates that the process has completed successfully and how many modules are on either side of the base. This information may be registered and used to perform monitoring and allocation operations.

6. Library Monitoring and Drive Allocation

In one or more embodiments, library controller card 102 is configured to perform monitoring and allocation operations. During a monitoring operation, library controller card 102 may receive status signals from each of the drive trays in base module 100 as well as each of the drive trays in the connected expansion modules. Each of the drive trays may send the status signals through a series of Ethernet switch ports forming a network path back to library controller card. Based on the received status information, library controller card 102 may generate a set of logs and/or reports based on the collected status information.

Figure 7:
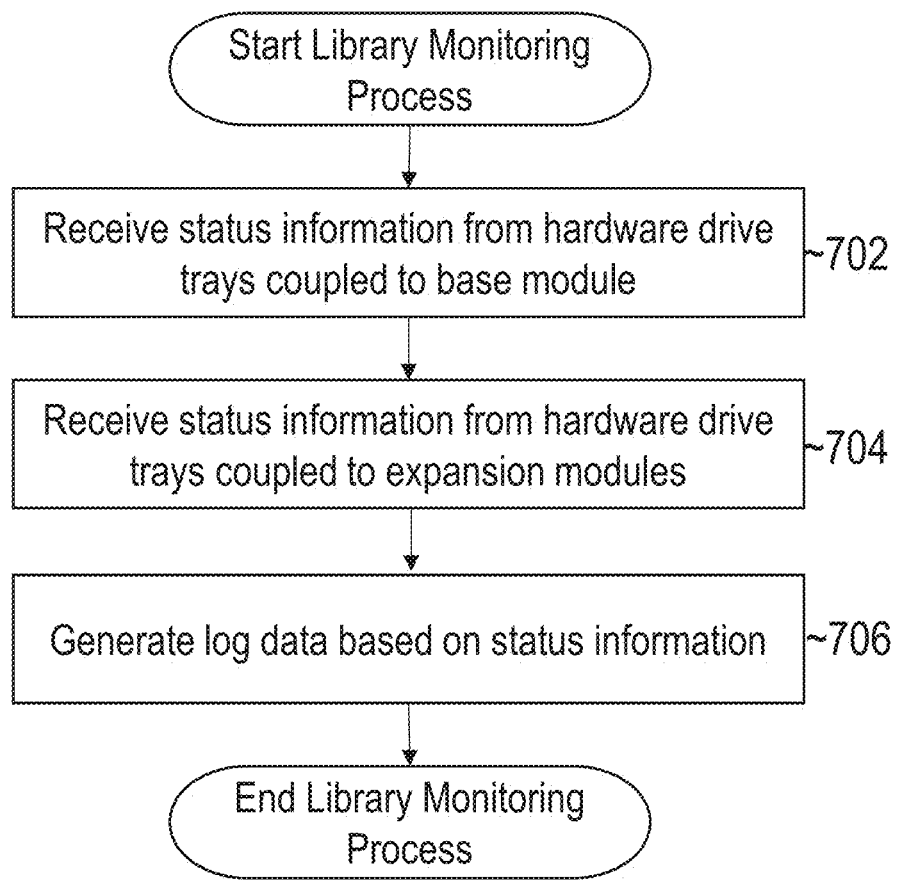
FIG. 7 illustrates an example set of operations for monitoring hardware drives in a data storage library according to one or more embodiments.

FIG. 7 illustrates an example set of operations for monitoring hardware drives in a data storage library according to one or more embodiments. The set of operations includes receiving, by library controller card 102, status information, from hardware drive trays coupled to base module 100 (Operation 702). Example status messages may include, but are not limited to, data indicating whether the drive has power, whether the drive is currently active such as when a drive is performing a read or write operation, whether the drive is experiencing any faults, and whether the drive is overheating.

The set of operations further includes receiving status information from hardware drive trays coupled to expansion modules (Operation 704). The status information may be collected from each of the drive trays and routed over different ports/network paths back to library controller card 102.

Based on the received status information, library controller card 102 generates a set of log data (Operation 706). The log data may include any combination of status information, such as which drives are fully operational, which drives are experiencing faults, how many slots are filled, how many expansion modules are connected, etc. If any problems are detected, library controller card 102 may generate an alert message to notify an administrator. The alert message may be displayed on interface panel 116 and/or sent to a library client or other network host.

In one or more embodiments, library controller card 102 may perform drive allocation operations based in part on the received status messages. For example, library controller card 102 may determine, from the status messages, what type of drive is coupled to each slot. If a server drive is coupled to a slot, then robotic media handler 140 does not attempt to load physical media into that drive. On the other hand, library controller card 102 may select storage drives to perform read and write operations based on factors such as which drives are available, the positions of the drives, which drives are experiencing faults, etc.

Figure 8:
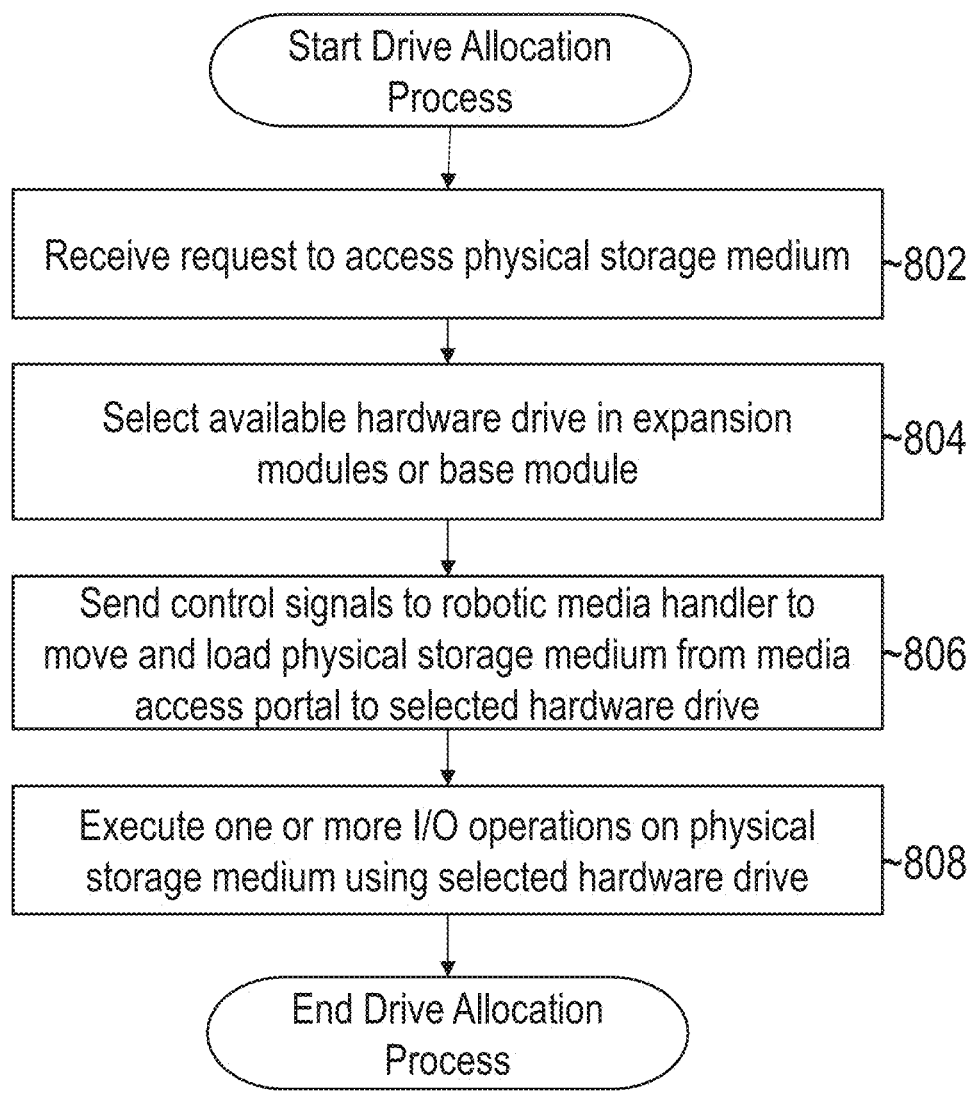
FIG. 8 illustrates an example set of operations for allocating storage drives in a data storage library according to one or more embodiments.

FIG. 8 illustrates an example set of operations for allocating storage drives in a data storage library according to one or more embodiments. Library controller card 102 receives a request to access physical storage media within data storage library 150 (Operation 802). The request may be a read or write request. In some cases, the request may target a specific disc or cartridge, which may be identified based on volume identifiers and/or other attributes. In other cases, library controller card 102 may select from a number of tapes, cartridges, or other physical storage media.

Responsive to the request, library controller card 102 selects an available storage drive in an expansion or base module (Operation 804). As previously indicated, the selection may be made based on one or more factors, such as which drives are available, the positions of the drives, which drives are experiencing faults, etc. If a specific physical storage medium (e.g., cartridge or disc) is targeted, then the selection may be made to minimize the distance the robot travels. For example, library controller card 102 may select the closest available storage drive to a cartridge, which may be in a base module or expansion module depending on the location of the cartridge. In other cases, the selection may take into account load balancing between the expansion modules. For example, if one robot is currently active loading a disc into a storage drive on one expansion module, library controller card 102 may send another robot to a different performance zone to use drives in a different expansion module. This may help minimize robot interference.

Once the drive has been selected, library controller card 102 sends control signals to robotic media handler 140 to move and load physical storage media from a media access portal to the selected hardware drive (Operation 806). As described above, the control signals may cause the robot to move along a rail on the wall of the library until positioned adjacent to the media access port. The robot may then secure the cartridge or disc and move along the rail until positioned adjacent to the selected hardware drive. The robot may then enter and mount the cartridge or disc into the hardware drive.

Library controller card 102 also sends command signals to the hardware drive to execute one or more I/O operations on the loaded physical storage medium (Operation 808). The commands may include a data payload to write or identify a data object to read. Responsive to receiving the command signal, the library interface card on the selected hardware drive may coordinate the read or write using the local hardware components. Once the I/O operation is complete, the physical storage medium may be unmounted, ejected, and moved back to a media access portal.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks. Volatile media includes dynamic memory, such as random access memory (RAM). Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise a bus. Transmission media can also take the form of acoustic or light waves, such as those generated during radio-wave and infra-red data communications.

Various forms of media may be involved in carrying one or more sequences of one or more instructions to a hardware processor for execution. For example, the instructions may initially be carried on a magnetic disk or solid state drive of a remote computer. The remote computer can load the instructions into its dynamic memory and send the instructions over one or more data communication networks to the data storage library. A network interface card within the data storage library can receive the data through the network and use an infra-red transmitter to convert the data to an infra-red or other type of signal. An infra-red or other detector can receive the data carried in the signal and appropriate circuitry can place the data on a bus. The bus may then carry the data to dynamic memory within the data storage library, from which one or more hardware processors retrieve and execute the instructions. The instructions in dynamic memory may optionally be stored on non-volatile storage either before or after execution by a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus for modularly expanding a base module apparatus, the apparatus comprising:
  a plurality of drive trays including a first drive tray coupled to a first hardware device and a second drive tray coupled to a second hardware device; and
  a redundant network switch for coupling the apparatus to the base module apparatus through redundant network paths; and
  a set of one or more links for communicating with one or more other expansion modules that are coupled to the base module to identify a position relative to the base module apparatus and one or more other expansion module apparatuses;
  wherein the first drive tray is coupled to the network switch and includes a first hardware processor that sends status information about the first hardware device to the base module apparatus over a first network path;
  wherein the second drive tray is coupled to the network switch and includes a second hardware processor that sends status information about the second hardware device to the base module apparatus over a second network path;

wherein the position relative to the base module apparatus is determined based on a signal propagated through a chain of modules including the base module apparatus and the one or more expansion module apparatuses;

wherein the processor associated with the redundant network switch determines a first network address for the first hardware device and a second network address for the second network device based, at least in part, on the position relative to the base module apparatus and the one or more other expansion module apparatuses.

2. The apparatus of claim 1, further comprising a set of hardware resources that are coupled to and shared by the plurality of drive trays; and a third hardware processor coupled to the network switch that sends status information to the base module apparatus about the set of hardware resources that are coupled to and shared by the plurality of drive trays; wherein the third hardware processor receives commands for controlling the set of hardware resources that are coupled to and shared by the plurality of drive trays.

3. The apparatus of claim 1, wherein the network switch is a first network switch in the apparatus; wherein the first drive tray includes a second network switch; wherein a first port of the first network switch is coupled to a first port of the second network switch; wherein a second port of the first network switch is coupled to a second port of the second network switch; wherein a third port of the second network switch is coupled to the first hardware device; wherein a fourth port of the second network switch is coupled to the first hardware processor.

4. The apparatus of claim 3, wherein a fifth port of the second network switch is coupled to at least one of a power supply for the drive tray, an encryption card in the drive tray, a second processor, a server, or a fan in the drive tray.

5. The apparatus of claim 1, wherein the first hardware processor is configured to control at least one of a first fan, a first drive power supply, or a first drive status light emitting diode that is local to the first drive tray; wherein the second hardware processor is configured to control at least one of a second fan, a second drive power supply, or a second drive status light emitting diode that is local to the second drive tray.

6. The apparatus of claim 1, wherein the first drive tray and the second drive tray have equal dimensions; and wherein the first hardware device is at least one of a tape drive or an optical drive; and wherein the second hardware device is a server or JBOD.

7. The apparatus of claim 6, wherein a robot associated with the base module apparatus is configured to retrieve at least one of a cartridge or optical disc from a media access port and load at least one of the cartridge or optical disc into the first hardware device based on the status information.

8. The apparatus of claim 1, wherein the set of one or more links includes a first serial port for coupling to one of the base module apparatus, an expansion module apparatus, or a terminator to the left of the apparatus and a second serial port for coupling to one of the base module apparatus, an expansion module apparatus, or a terminator to the right of the apparatus, wherein the processor determines the position relative to the base module apparatus based on one or more signals that traverse the first serial port and the second serial port.

9. A storage library system comprising:
a media library including a plurality of physical storage media;
a plurality of drive slots coupled to a plurality of drive trays including a first set of one or more drive trays that are coupled to one or more respective media drives for reading and writing data to the physical storage media and a second set of one or more drive trays that are coupled to one or more respective servers;
wherein the first set of one or more drive trays and the second set of one or more drive trays are interchangeable between the plurality of slots;
a robot media handler that moves physical storage media between the media library and the one or more respective media drives; and
a library control card coupled to the plurality of drive trays slots and the robot media handler, wherein the library control card determines which of the plurality of drive slots include media drives and sends control signals to the robot media handler for moving physical storage media between the media library and the one or more respective media drives responsive to requests from the one or more respective servers and based on status information received from the one or more respective media drives.

10. The storage library system of claim 9, wherein the library control card is further configured to register what type of device is coupled to each drive slot of the plurality of drive slots.

11. The storage library system of claim 9, wherein each drive slot of the plurality of drive slots is couplable to a respective drive tray such that the respective drive tray is provided with power, cooling, and redundant communications channels to the library control card.

12. The storage library system of claim 9, wherein the physical storage media includes at least one of an optical disc or a tape cartridge.

13. A method comprising:
generating, by a first processor in a base module comprising a first set of processing elements, a first value;
assigning, by the first processor in the base module, to a first processing element of the first set of processing elements in the base module a first unique network address based, at least in part, on the first value;
sending the first value from the base module to at least one adjacent module comprising a second set of processing elements;
generating, by a second processor in the adjacent module, a second value that is different than the first value;
assigning, by the second processor in the adjacent module, to a second processing element of the second set of processing elements in the adjacent module, a second unique network address based, at least in part, on the second value; and
routing data to the first processing element using the first unique address and the second processing element using the second network address.

14. The method of claim 13, wherein the second value is generated based on the position of the adjacent module relative to base module.

15. The method of claim 13, wherein the first set of processing elements include a first set of data storage drives in a data storage library; wherein the second set of processing elements include a second set of data storage drives in the data storage library.

16. The method of claim 13 wherein the first processing element is associated with a first hardware drive and communicates first status information that indicates whether the first hardware drive is currently available for loading physical storage media; and wherein the second processing element is associated with a second hardware drive and communicates second status information that indicates whether the second hardware drive is currently available for loading physical storage media.

17. The method of claim 13, wherein at least one of the base module or the adjacent module are coupled to a plurality of drive trays; wherein at least one drive tray includes a storage drive; wherein at least one drive tray includes a hardware drive tray other than the storage drive.

18. The method of claim 13, wherein at least one drive tray that includes a storage drive is interchangeable in a module with the at least one drive tray that includes a hardware drive tray other than the storage drive.

19. The storage library system of claim 9, wherein the plurality of drive slots include a first subset of drive slots in a first set of one or more modules and a second subset of drive slots in a second subset of one or more modules; wherein the first subset of drive slots are configured to be in a different performance zone than the second subset of drive slots such that a first robot may access the first subset of drive slots without interfering with a second robot accessing the second subset of drive slots.

\* \* \* \* \*